United States Patent
Otsuka et al.

(10) Patent No.: US 6,955,089 B2
(45) Date of Patent: Oct. 18, 2005

(54) PRESSURE SENSOR

(75) Inventors: Takeshi Otsuka, Hazu-gun (JP); Seiichirou Ootake, Hazu-gun (JP)

(73) Assignee: Denso Corporation, Kariya (JP)

(*) Notice: Subject to any disclaimer, the term of this patent is extended or adjusted under 35 U.S.C. 154(b) by 21 days.

(21) Appl. No.: 10/680,142

(22) Filed: Oct. 8, 2003

(65) Prior Publication Data

US 2004/0069068 A1 Apr. 15, 2004

(30) Foreign Application Priority Data

Oct. 8, 2002  (JP) ...................................... 2002-295002

(51) Int. Cl.$^7$ ................................................ G01L 7/00
(52) U.S. Cl. ............................................ 73/715; 438/53
(58) Field of Search ........................ 73/715, 724, 756, 73/700; 438/53

(56) References Cited

U.S. PATENT DOCUMENTS

| | | | | |
|---|---|---|---|---|
| 5,064,165 A | * | 11/1991 | Jerman | 251/61.1 |
| 5,116,457 A | * | 5/1992 | Jerman | 438/53 |
| 5,177,579 A | * | 1/1993 | Jerman | 73/724 |
| 5,209,118 A | * | 5/1993 | Jerman | 73/715 |
| 5,565,629 A | | 10/1996 | Yamashita | |
| 2002/0162399 A1 | * | 11/2002 | Esashi et al. | 73/715 |
| 2004/0079161 A1 | * | 4/2004 | Shimomoto et al. | 73/756 |

FOREIGN PATENT DOCUMENTS

| | | |
|---|---|---|
| JP | A-S63-243830 | 2/1996 |
| JP | A-H08-159900 | 6/1996 |

* cited by examiner

*Primary Examiner*—William Oen
*Assistant Examiner*—Andre Allen
(74) *Attorney, Agent, or Firm*—Posz Law Group, PLC

(57) ABSTRACT

A pressure sensor includes a casing having a pressure detection chamber, a diaphragm for receiving pressure of a measuring object and disposed on the casing, and a pressure detection element. The pressure detection chamber is filled with a liquid, and the diaphragm contacts the liquid. The pressure detection element is disposed in the pressure detection chamber to receive the pressure of the liquid. The diaphragm has a plate shape with a radius of R and includes a circumference and a center of the plate. The circumference is fixed to the casing. The diaphragm further includes a corrugate disposed concentrically with the center of the diaphragm and having a half circular cross-section and a top of the half circle. The top of the corrugate is disposed within a distance of 0.6 R from the center of the diaphragm.

8 Claims, 5 Drawing Sheets

FIG. 1

PRESSURE

PRESSURE SENSOR

CROSS REFERENCE TO RELATED APPLICATION

This application is based on Japanese Patent Application No. 2002-295002 filed on Oct. 8, 2002, the disclosure of which is incorporated herein by reference.

FIELD OF THE INVENTION

The present invention relates to a pressure sensor having a corrugated diaphragm.

BACKGROUND OF THE INVENTION

A pressure sensor having a corrugated diaphragm according to a prior art is disclosed in U.S. Pat. No. 5,565,629. The pressure sensor includes a casing having a pressure detection chamber for accommodating liquid, a plate shape diaphragm for receiving pressure of a measuring object, and a pressure detection element for detecting pressure of the liquid. The diaphragm is disposed so as to contact the liquid enclosed in the pressure detection chamber. The pressure detection element is disposed in the pressure detection chamber to detect the pressure of the liquid. The pressure of the measuring object is transmitted from the diaphragm to the pressure detection element through the liquid. The circumferential portion of the diaphragm is mounted on the casing. The diaphragm has a corrugate disposed concentrically with the diaphragm and having a half circular cross-section, i.e., an arch shape.

The pressure receiving area of the diaphragm for receiving the pressure becomes large because of the corrugate. Therefore, fluctuation of the pressure of liquid in the pressure detection chamber can be reduced. The fluctuation of the pressure is, for example, caused by temperature change.

In the pressure sensor having the corrugated diaphragm, the corrugate is disposed on almost circumferential side of the diaphragm, i.e., disposed on a circumference of the diaphragm. Here, the circumference of the diaphragm is fixed to the casing.

It is required to minimize a size of the pressure sensor. By this minimization of the sensor, a diameter of the diaphragm, i.e., an area of the diaphragm also becomes small. In this case, an inner pressure of the pressure detection chamber, i.e., the pressure of the liquid applied to the diaphragm per unit area becomes higher. Therefore, characteristic curvature of the pressure sensor between the inner pressure and a variation of the diaphragm deviates from a linear curve, i.e., becomes nonlinear as the inner pressure becomes higher.

Therefore, to minimize the pressure sensor, it is required that the characteristic curvature has high linearity in a range between a low pressure and a high pressure.

SUMMARY OF THE INVENTION

In view of the above problem, it is an object of the present invention to provide a pressure sensor having a corrugated diaphragm, characteristic curvature of which has a high linearity in a range between a low pressure and a high pressure, the characteristic curvature being defined by a relationship between pressure and a variation of the diaphragm.

Pressure sensor includes a casing having a pressure detection chamber, a diaphragm for receiving pressure of a measuring object and disposed on the casing, and a pressure detection element for detecting the pressure. The pressure detection chamber is filled with a liquid, and the diaphragm contacts the liquid. The pressure detection element is disposed in the pressure detection chamber to receive the pressure of the liquid. The diaphragm has a plate shape with a radius of R and includes a circumference and a center of the plate. The circumference is fixed to the casing. The diaphragm further includes a corrugate disposed concentrically with the center of the diaphragm and having a half circular cross-section and a top of the half circle. The top of the corrugate is disposed within a distance of 0.6 R from the center of the diaphragm.

In the above sensor, the top of the corrugate is disposed near the center of the diaphragm. Therefore, a pressure receiving area of the corrugate becomes small, so that the correctable limitation of a variation of the diaphragm becomes higher. Thus, characteristic curvature defined by a relationship between pressure of the liquid and the variation of the diaphragm has a high linearity in a range between a low pressure and a high pressure.

Preferably, the top of the corrugate is disposed at a distance of 0.5 R from the center of the diaphragm. In this case, the characteristic curvature has a comparatively large slope, so that sensitivity of the pressure sensor becomes high. Thus the pressure sensor has both the comparatively high sensitivity and the high linearity of the characteristic curvature.

Further, pressure sensor includes a casing having a pressure detection chamber filled with liquid, a diaphragm for receiving pressure of a measuring object and for covering the pressure detection chamber to seal the liquid, and a pressure detection element disposed in the pressure detection chamber for detecting the pressure of the liquid. The diaphragm includes a corrugate with a top thereof. The top of the corrugate is disposed within a predetermined distance from a center of the diaphragm.

In this case, the sensor has the characteristic curvature having a high linearity in a range between a low pressure and a high pressure.

BRIEF DESCRIPTION OF THE DRAWINGS

The above and other objects, features and advantages of the present invention will become more apparent from the following detailed description made with reference to the accompanying drawings. In the drawings:

FIG. 3A is a partially enlarged cross-sectional view showing the diaphragm.

DETAILED DESCRIPTION OF THE PREFERRED EMBODIMENT

Figure 1:
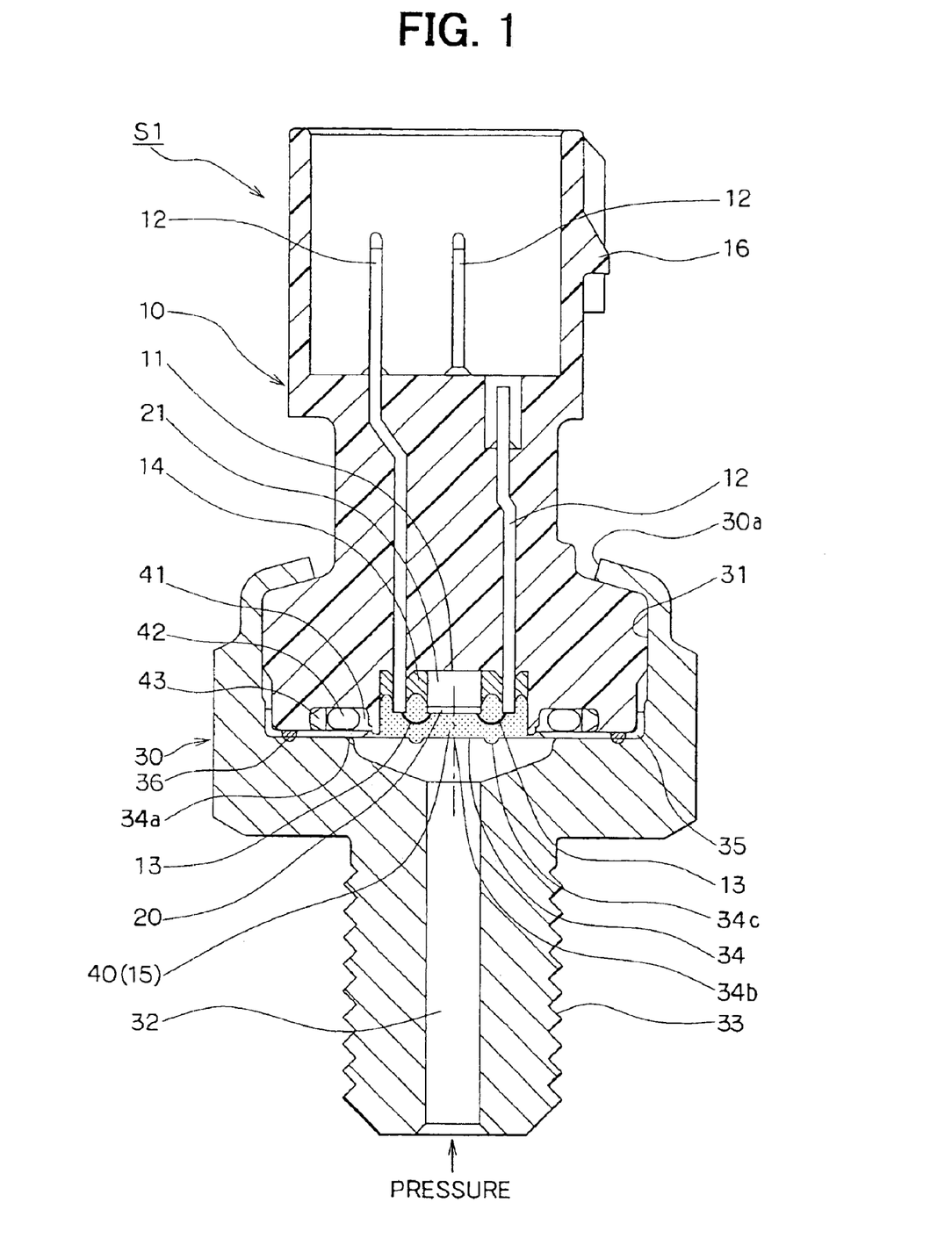
FIG. 1 is a schematic cross-sectional view showing a pressure sensor according to a preferred embodiment of the present invention.

A pressure sensor S1 according to a preferred embodiment of the present invention is shown in FIG. 1. The pressure sensor S1 is suitably used for a vehicle, and detects pressure such as fuel pressure in a fuel injection system of the vehicle, and refrigerant pressure of an air-conditioning system of the vehicle.

The pressure sensor S1 includes a casing composed of a connector casing 10 and a housing 30. The connector casing 10 is made of resin such as poly-phenylene sulfide (i.e., PPS) and poly-butylene telephthalate (i.e., PBT). The connector casing 10 has a cylindrical shape, and includes a concavity 11 disposed on one end of the connector casing 10. A sensor chip 20 as a pressure detection element is disposed in the concavity 11. The sensor chip 20 is a semiconductor chip having a diaphragm (not shown) as a pressure receiving surface. The diaphragm of the sensor chip 20 detects the pressure, so that the chip 20 converts the pressure to an electric signal. The signal is outputted from the chip 20 as a sensor signal.

The sensor chip 20 and a base 21 are integrated by an anodic bonding method and, the like. The base 21 is made of glass and the like. The base 21 integrated with the sensor chip 20 is adhered to a bottom surface of the concavity 11, so that the sensor chip 20 is mounted on the connector casing 10.

The connector casing 10 includes a plurality of terminals 12 (i.e., a connector pin) for connecting the sensor chip 20 and an outer circuit electrically. Each terminal 12 is a metallic rod, which is made of brass coated with nickel and the like. The nickel is coated on the brass by a metal plating method. The terminal 12 and the connector casing 10 are integrally formed by the insert mold method, so that the terminal 12 is mounted in the connector casing 10.

One end of the terminal 12 protrudes from the bottom of the concavity 11 at around a mounting portion of the sensor chip 20. This protrusion portion of the terminal 12 and the sensor chip 20 are electrically connected with a wire 13, which is made of gold, aluminum, or the like and bonded by a wire bonding method. A seal 14 is disposed around the protrusion portion of the terminal 12, and seals a clearance between the connector casing 10 and the terminal 12. The seal 14 is made of silicon resin and the like. Even if a clearance is disposed on the bottom portion of the concavity 11, the clearance can be sealed by the seal 14.

The concavity 11 is filled with oil 15, so that the sensor chip 20, the terminal 12, the wire 13, and the seal 14 are dipped into the oil 15. The oil 15 is composed of fluoro-oil and the like. The oil 15 mainly works as a pressure transfer material.

The other end of the connector casing 10 has a connector head 16, which is opposite to the sensor chip 20. The connector head 16 works as a connector for connecting the other end of the terminal 12, which is opposite to the protrusion portion, to an outer circuit such as an electronic control unit of a vehicle through an outside wiring such as a wiring harness (not shown). The sensor chip 20 and the outside circuit are electrically connected so that a signal between them is transmitted through the wire 13 and the terminal 12.

The housing 30 is made of metallic material such as stainless steal (i.e., SUS). The housing 30 includes an opening portion 31 disposed on the upper side of the housing 30, and a pressure introduction port 32 disposed on the lower side of the housing 30. The pressure introduction port 32 introduces a measuring object such as refrigerant of an air-conditioning system of the vehicle and fuel in a fuel injection system of the vehicle so that the sensor chip 20 detects the pressure of the measuring object. The housing 30 further includes a screw portion 33 disposed on the circumferential wall of the housing 30 for mounting the pressure sensor S1 to a certain portion of the vehicle such as a refrigerant pipe of the air-conditioning system and a fuel pipe of the vehicle.

The lower end of the connector casing 10 is inserted into the opening portion 31 of the housing 30 so that the concavity 11 is covered with the connector casing 10. Then, a hook 30a of the housing 30, which is disposed on the upper side of the housing 30, crimps the connector casing 10. The housing 30 includes a diaphragm 34 and a ring weld 35. The diaphragm 34 for receiving the pressure of the measuring object has a plate shape, and made of metallic material such as SUS. The ring weld 35 for press-holding the diaphragm 34 is made of metallic material, and has a ring shape surrounding the diaphragm 34.

The entire circumferential portion of the diaphragm 34 together with the ring weld 35 is welded to the housing 30, so that a weld portion 36 is formed of mixture of materials composing the diaphragm 34, the ring weld 35 and the housing 30. The weld portion 36 fixes the diaphragm 34 with the housing 30 and the ring weld 35. The ring weld 35 and the housing 30 sandwich the diaphragm 34 so that the diaphragm 34 is fixed. Therefore, the circumference 34a of the diaphragm 34 is fixed to the housing 30, so that the diaphragm 34 seals the oil 15. Moreover, the diaphragm 34 separates between the concavity 11 and the pressure introduction port 32. The circumference 34a of the diaphragm 34 also works as a fixation end of the diaphragm 34.

Thus, the oil 15 is sealed between the concavity 11 of the connector casing 10 and the diaphragm 34, i.e., the oil 15 is sealed in the pressure detection chamber 40.

The pressure sensor S1 includes a casing composing the connector casing 10 and the housing 30. The pressure sensor S1 further includes the pressure detection chamber 40. The oil 15 is sealed in the pressure detection chamber 40, so that the diaphragm 34 contacts the oil 15. The sensor chip 20 as a pressure detection element is disposed in the pressure detection chamber 40 so that the sensor chip 20 receives the pressure of the oil 15.

A ring groove 41 for an O-ring 42 is disposed outside the pressure detection chamber 40. The O-ring 42 is disposed in the ring groove 41 so as to seal the pressure detection chamber 40 water-tightly. The O-ring 42 is made of elastic material such as silicon rubber. The O-ring 42 is sandwiched and pressed between the connector casing 10 and the ring weld 35, so that the O-ring 42 together with the diaphragm 34 seals the pressure detection chamber 40, i.e., the oil 15 in the concavity 11.

A back up ring 43 is disposed in the ring groove 41 and disposed outer circumference of the O-ring 42. The back up ring 43 is made of resin material such as tetra-fluoro-ethylene. Here, the tetra-fluoro-ethylene is strong enough that the O-ring 42 is limited to be damaged in a case where the O-ring 42 is extended and clipped between the connector casing 10 and the ring weld 35.

Figure 2A:
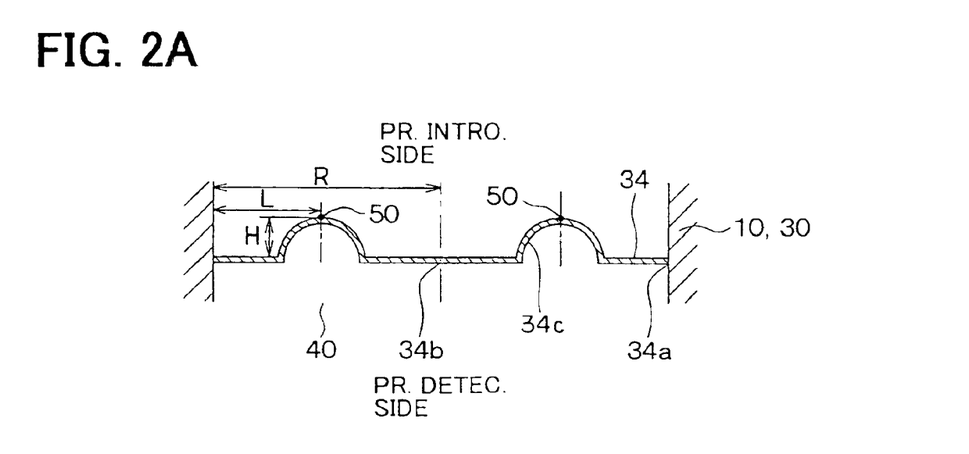
FIGS. 2A and 2B are a partially enlarged cross-sectional view and a partially enlarged plan view showing a diaphragm, according to the preferred embodiment.
Figure 2B:
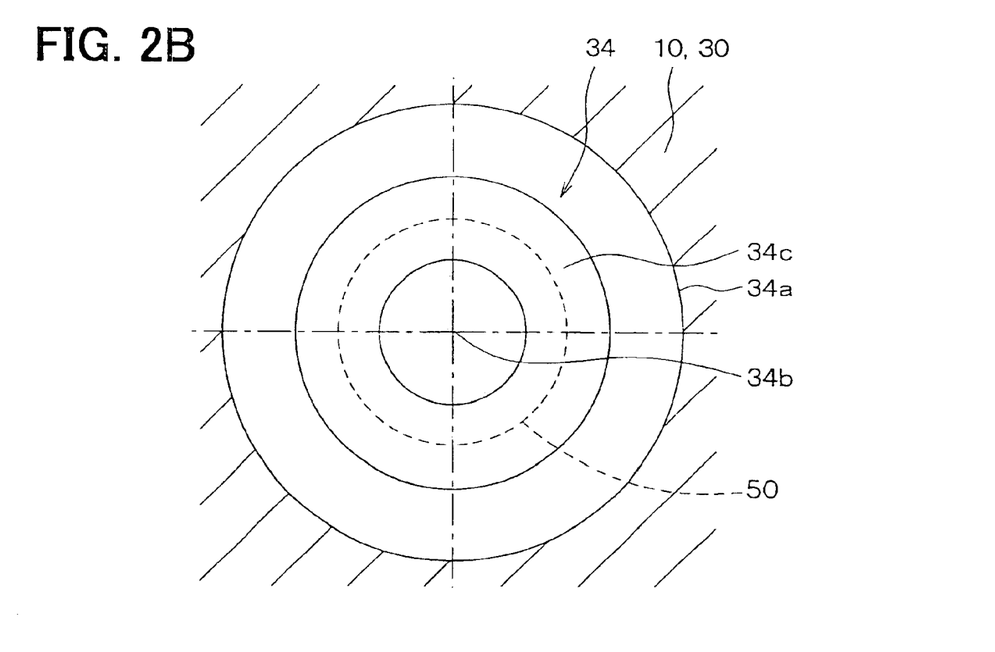

As shown in FIGS. 2A and 2B, the diaphragm 34 has a characteristic construction described as follows. Here, the upside of FIG. 2A is the pressure introduction port side (i.e., PR INTRO SIDE), and the lower side of FIG. 2A is the pressure detection chamber side (i.e., PR DETEC SIDE). The circumference 34a of the diaphragm 34 having a plate shape is fixed to the case. The diaphragm 34 has a corrugate 34c, which is disposed concentrically with a center 34b of the diaphragm 34, and has a half circular cross-section. The cross-section of the corrugate 34c is a half circle having a top 50. A distance L between the top 50 of the half circle, i.e., the top 50 of the corrugate 34c and the circumference 34a of the diaphragm 34 is equal to or larger than 0. 4 R, when the radius of the diaphragm 34 is R. In other words, the top 50 of the corrugate 34c is disposed within a distance of 0.6 R from the center 34b. The corrugate 34c has a height H, which is about 0.04 R. Preferably, the top 50 of the corrugate 34c *is disposed within a distance of* 0.5 R from the center 34b, i.e., the distance L of the corrugate 34c is equal to or larger than 0.5 R. More preferably, the top 50 of the corrugate 34c is disposed at the distance of 0.5 R from the center 34b, i.e., the distance L of the corrugate 34c is equal to 0. 5 R. In other words, the top 50 of the corrugate 34c is disposed on a middle circle between the center 34b of the diaphragm 34 and the circumference 34a of the diaphragm 34.

In this embodiment, the radius R of the diaphragm 34 is 6 mm, i.e., the diameter of the diaphragm 34 is 12 mm. A thickness of the diaphragm 34 is 50 f.lm. The diaphragm 34 is made of stainless steel and the like, and formed by a press working method. The distance L of the corrugate 34c is 0.5 R.

Although the corrugate 34c is protruded to the pressure introduction port side, i.e., the pressure receiving surface side of the diaphragm 34, the corrugate 34c can be protruded to the pressure detection chamber side, i.e., the oil side.

The pressure sensor S1 is manufactured by a following method. The terminal 12 is inserted into the connector casing 10, and then molded with the connector casing 10, i.e., the terminal 12 is insert-molded in the connector casing 10. Then, the sensor chip 20 is adhered to the concavity 11 of the connector casing 10 through the base 21 with using an adhesive material such as silicon resin. A sealing material is injected into the concavity 11 so as to fill all around the terminal 12, and then the sealing material is hardened so that the seal 14 is formed. Then, the wire 13 connects the protruded portion of the terminal 12 and the sensor chip 20 with using a wire bonding method.

Next, the connector casing 10 is placed to be the sensor chip side up, so that a predetermined amount of the oil 15 such as the fluoro oil is injected into the concavity 11 from the upside of the connector casing 10 with using a dispenser and the like.

Then, the diaphragm 34 and the ring weld 35 are bonded to the housing 30 with using all-around welding. The housing 30 is placed to keep in a horizontal position, so that the connector casing 10 is inserted into the opening portion 31 of the housing 30. This housing 30 with the connector casing 10 is placed in a vacuum chamber. The vacuum chamber is vacuumed so that an excess air in the pressure detection chamber 40 is evacuated.

Then, the connector casing 10 is pressed so as to contact the ring weld 35 to the connector casing 10, so that the pressure detection chamber 40 is formed. Thus, the pressure detection chamber 40 is sealed by the diaphragm 34 and the O-ring 42. The hook 30a of the housing 30 crimps the connector casing 10 so that the connector casing 10 is mounted in the housing 30. Thus, the pressure sensor S1 is accomplished.

The pressure sensor S1 is operated by the following method. The pressure sensor S1 is mounted in a-certain position of the vehicle with the screw portion 33 of the housing 30. The measuring object such as fuel in a fuel injection system of the vehicle and refrigerant of an air-conditioning system of the vehicle is introduced into the pressure sensor S1 through the pressure introduction port 32 of the housing 30 so that the pressure of the measuring object is applied to the pressure sensor S1. Then, the pressure is applied to the diaphragm 34, so that the diaphragm 34 is strained, i.e., a distortion stress is applied to the diaphragm 34. This stress is transmitted to the sensor chip 20 through the oil 15, so that the pressure of the oil 15 attributed to the stress is applied to the pressure receiving surface of the sensor chip 20.

Then, the sensor chip 20 outputs a sensor signal as an electric signal in proportion to the pressure of the oil 15. The sensor signal is transmitted from the sensor chip 20 through the wire 13 and the terminal 12 to the outside circuit.

In this pressure sensor S1, the top 50 of the corrugate 34c is disposed within a distance of 0.5 R from the center 34b, i.e., the distance L of the corrugate 34c is 0.5 R. This reason is described as follows.

To minimize a size of the pressure sensor S1, the inventors manufactured a test pressure sensor T1 for a comparison of the above pressure sensor S1. The test pressure sensor T1 has a corrugate disposed on a circumferential side of a diaphragm, i.e., the corrugate is disposed near the circumference of the diaphragm. The radius of the diaphragm of the test pressure sensor T1 becomes small. For example, the radius is 6 mm or less. Here, ordinary the radius is 7–8 mm in a pressure sensor according to a prior art.

Figure 6:
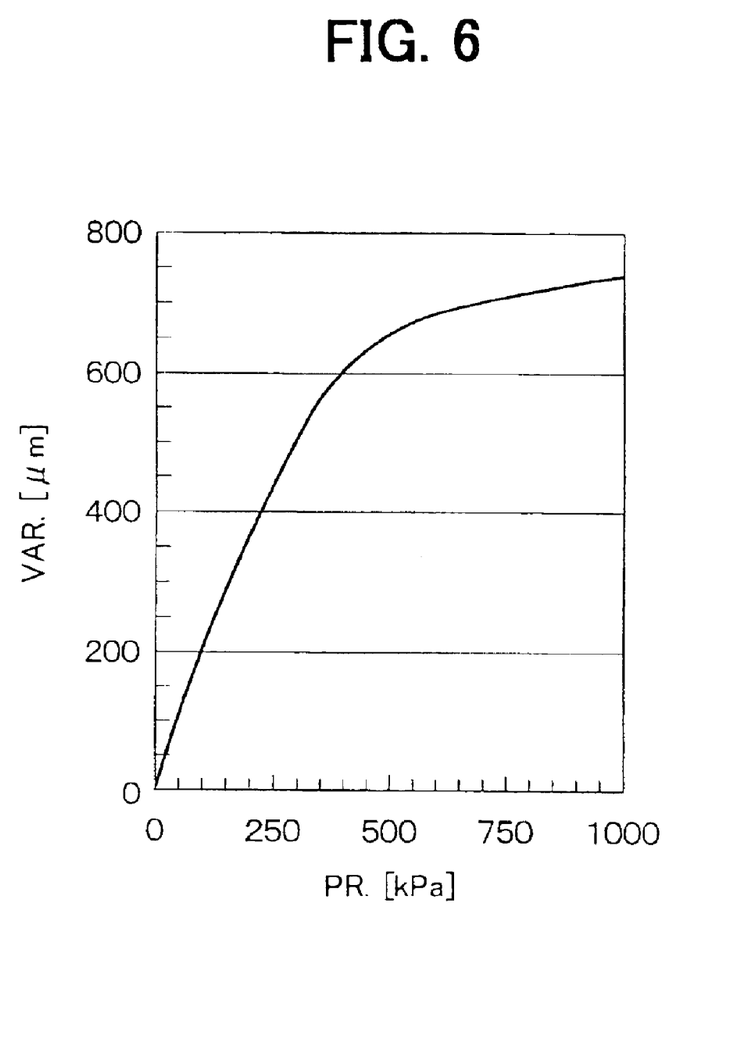
FIG. 6 is a graph showing the relationship between the inner pressure and the variation of the diaphragm, according to the preferred embodiment.

A relationship between an inner pressure of a pressure detection chamber of the test pressure sensor T1 and a variation of the diaphragm is shown in FIG. 6. Here, the inner pressure is an oil pressure in the pressure detection chamber.

When temperature of the sensor T1 becomes higher so that oil in the pressure detection chamber expands and the inner pressure of the pressure detection chamber becomes large, the relationship between the inner pressure and the variation becomes nonlinear. As shown in FIG. 6, when the inner pressure exceeds about 500 kPa, characteristic curvature, of the test pressure sensor T1 between the inner pressure and the variation deviates from a linear curve, i.e., becomes nonlinear.

When the radius of the diaphragm is comparatively large, for example, 7 mm or 8 mm, pressure applied to the diaphragm is comparatively small, so that the pressure sensor can be used only in a certain pressure range, in which the characteristic curvature is a linear curve. However, in the test pressure sensor T1 having a comparatively small radius of the diaphragm, pressure applied to the diaphragm becomes higher, so that the test pressure sensor T1 is required to use even in a high pressure range, in which characteristic curvature becomes nonlinear.

The variation of the diaphragm attributed to the variation of the inner pressure can be compensated when the characteristic curvature of the test pressure sensor T1 is linear, so that output of the test pressure sensor T1 is calibrated easily. The variation of the inner pressure of the pressure detection chamber attributes to, for example, temperature change of the test pressure sensor T1. However, when the characteristic curvature of the test pressure sensor T1 is nonlinear, i.e., the inner pressure of the pressure detection chamber becomes higher, the variation of the diaphragm is not compensated, so that the output of the test pressure sensor T1 is not calibrated easily.

Here, when the temperature of the test pressure sensor T1 is higher, for example, than 140° C., the inner pressure of the pressure detection chamber becomes higher so that the characteristic curvature of the test pressure sensor T1 is nonlinear. In general, the pressure sensor is tested after being manufactured in a predetermined sequence such that a room temperature test, a low temperature (e.g., 40° C.) test and a high temperature (e.g., 120° C.) test are performed in this order. That is, cost and time for testing becomes large since the sensor has to be cooled in a case where the high temperature test is firstly performed. In this high temperature test, the characteristic curvature of the test pressure sensor T1 is nonlinear, so that the test pressure sensor T1 is determined to be defective in a case where a high accuracy of the pressure sensor is required. However, after the room temperature test and the low temperature test are performed, the test pressure sensor 1 is determined to be defective, so that productivity of the pressure sensor becomes lower.

In the above test pressure sensor T1, the corrugate is disposed near the circumference of the diaphragm, so that the pressure receiving surface of the corrugate becomes large. Therefore, the variation of the diaphragm attributed to the variation of the inner pressure of the pressure detection chamber becomes large. Thus, the correctable limitation of the variation of the diaphragm is comparatively small when the inner pressure of the pressure detection chamber becomes high. Here, the correctable limitation is the limit of the variation of the diaphragm, which can be corrected, i.e., compensated. In the high inner pressure range beyond the limitation, the characteristic curvature of the test pressure sensor T1 deviates from a linear curve, i.e., becomes nonlinear as the inner pressure becomes higher.

In view of the above problem, it is considered that a position of the corrugate is changed to be close to the center of the diaphragm so that the pressure receiving surface of the corrugate becomes small. When the pressure receiving surface of the corrugate becomes small, the pressure receiving surface of the diaphragm also becomes small. Although a sensitivity of the pressure sensor decreases a little, the correctable limitation of the variation of the diaphragm becomes higher.

In this embodiment, the pressure sensor S1 has the top 50 of the corrugate 34c disposed within a distance of 0.6 R from the center 34b, i.e., the distance L of the corrugate 34c is equal to or larger than 0.4 R. Therefore, the pressure receiving surface of the corrugate 34c becomes small, so that the correctable limitation of the variation of the diaphragm 34 becomes higher. Thus, the characteristic curvature of the pressure sensor S1 between the inner pressure of the pressure detection chamber, 40 and the variation of the diaphragm 34 has a high linearity in a range between a low pressure and a high pressure. In other words, the characteristic curvature keeps linearity in the comparatively high inner pressure.

Figure 3A:
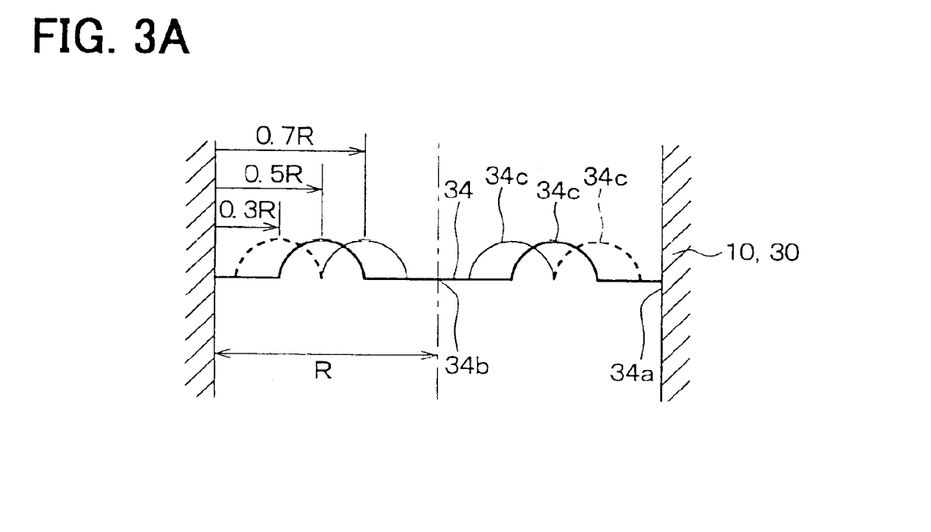
Figure 3B:
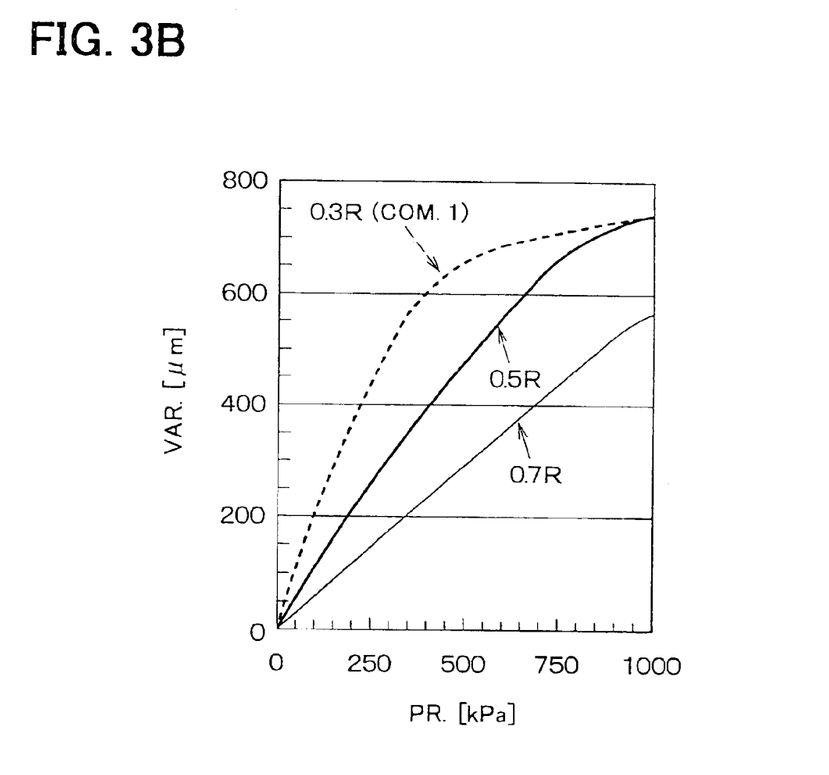
FIG. 3B is a graph showing a relationship between an inner pressure and a variation of the diaphragm, according to the preferred embodiment.

The characteristic curvature of various distances L of the corrugate 34c is shown in FIGS. 3A and 3B. In FIG. 3A, the distance L of the top 50 of the corrugate 34c varies from 0.3 R to 0.7 R. FIG. 3B shows three characteristic curvatures between the inner pressure and the variation, which correspond to the pressure sensor S1 having the distance L of 0.3 R, 0.5 R, and 0.7 R, respectively. These characteristic curvatures are obtained by a computer simulation analysis such as finite element method (i.e., FEM). Here, the inner pressure of the pressure detection chamber 40 is the pressure of the oil 15. As the temperature of the oil 15, i.e., the temperature of the pressure sensor S1 becomes higher, the oil 15 expands, so that the pressure of the oil 15 becomes higher. Here, the case where the distance L is 0.3 R represents the first comparison (i.e., COM 1).

As shown in FIG. 3B, the first comparison has the characteristic curvature with low linearity. On the other hand, in a case where the distance L is 0.5 R or 0.7 R, the characteristic curvature has high linearity.

When the pressure sensor S1 detects the pressure of the measuring object, actually, a total pressure of both the pressure applied to the diaphragm and the inner pressure of the pressure detection chamber 40 is applied to the sensor chip 20. The sensor chip 20 outputs the pressure signal in proportion to the total pressure. The pressure signal is inputted into the outside circuit so that the pressure signal is calibrated to deduct the inner pressure of the pressure detection chamber 40. Thus, the pressure signal is compensated so that the pressure of the measuring object applied to the diaphragm 34 is obtained.

Therefore, when the characteristic curvature of the pressure sensor S1 has high linearity, the above compensation of the pressure signal is easily performed. Moreover, even though the inner pressure of the pressure detection chamber 40 becomes high, i.e., the temperature of the pressure sensor S1 becomes high, the characteristic curvature keeps linearity. Therefore, in the above temperature test, the characteristic curvature of the pressure sensor S1 is linear, so that the number of defectives of the pressure sensor S1 is reduced. Thus, the productivity of the pressure sensor S1 becomes higher.

As shown in FIG. 3B, the characteristic curvature in case of 0.5 R has a comparatively large slope, which is larger than that of the characteristic curvature in case of 0.7 R. Therefore, the sensitivity of the pressure sensor S1 in case of 0.5 R becomes high. Here, the sensitivity of the pressure sensor S1 corresponds to the variation of the inner pressure of the pressure detection chamber 40. When the top 50 of the corrugate 34c becomes close to the center 34b of the diaphragm 34, the pressure receiving surface of the corrugate 34c becomes small, so that the sensitivity of the pressure sensor S1 is decreased.

Therefore, it is preferred that the top 50 of the corrugate 34c is disposed at the distance of 0.5 R from the center 34b, i.e., the distance L of the corrugate 34c is equal to 0.5 R. In this case, the sensitivity of the pressure sensor S1 is comparatively high, and the characteristic curvature between the inner pressure of the pressure detection chamber 40 and the variation of the diaphragm 34 has a comparatively high linearity.

Figure 4:
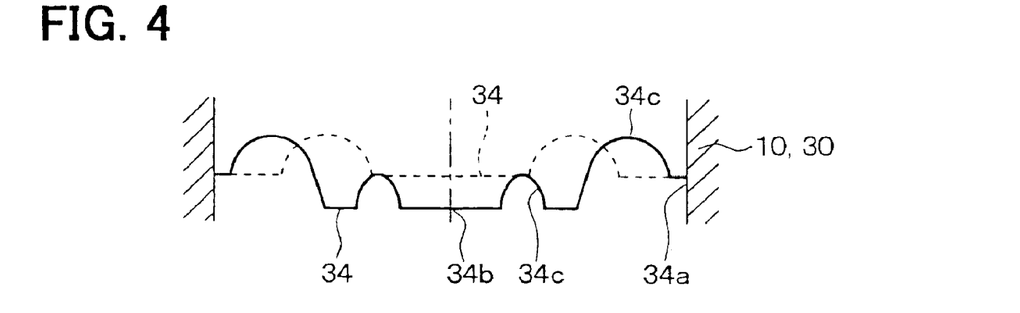
FIG. 4 is a partially enlarged cross-sectional view showing the diaphragm, according to the preferred embodiment.

The inventors further examined such that a pressure sensor T2 has two corrugates 34c disposed in the diaphragm 34. Here, the case where the pressure sensor T2 has two corrugates represents the second comparison (i.e., COM 2). As shown in FIG. 4, the pressure sensor T2 has two corrugates 34c. One corrugate 34c of the pressure sensor T2 is disposed within a distance of 0.5 R from the center 34b. The other corrugate 34c is disposed outside a distance of 0.5 R from the center 34b.

Figure 5:
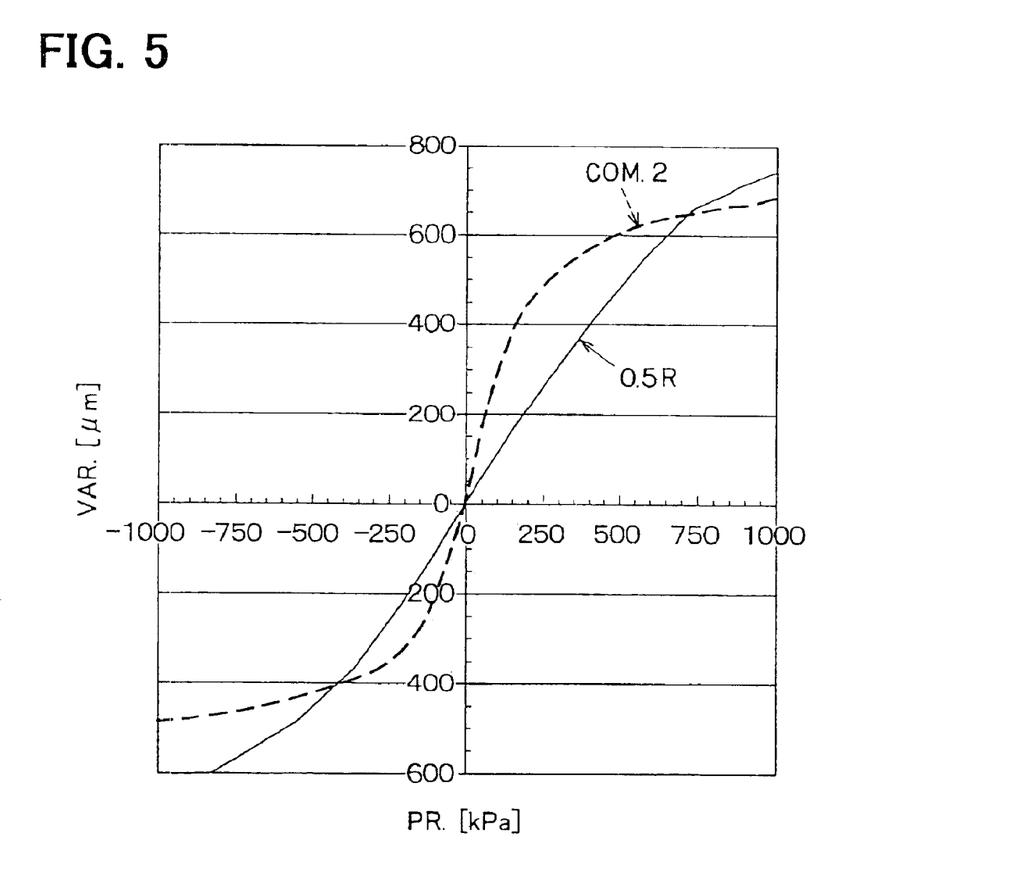
FIG. 5 is a graph showing the relationship between the inner pressure and the variation of the diaphragm, according to the preferred embodiment.

FIG. 5 shows two characteristic curvatures between the inner pressure and the variation, which correspond to the pressure sensor S1 having the distance L of 0.5 R, and the pressure sensor T2 having two corrugates 34c, respectively. These characteristic curvatures are obtained by the computer simulation analysis such as finite element method (i.e., FEM). As shown in FIG. 5, the pressure sensor T2 has a comparatively low linearity, i.e., the characteristic curvature of the pressure sensor T2 becomes nonlinear, compared with that of the pressure sensor S1 in case of 0.5 R.

Therefore, it is required that the top 50 of the corrugate 34c is disposed within a distance of 0.6 R from the center 34b, i.e., the distance L is larger than 0.4 R. In other words, the top 50 of the corrugate 34c should not be disposed in a range between the distance L of 0.4 R and the circumference 34a of the diaphragm 34. In the pressure sensor S1, even when the radius R of the diaphragm 34 becomes small, the characteristic curvature of the pressure sensor S1 has a high linearity in a range between a low pressure and a high pressure.

Such changes and modifications are to be understood as being within the scope of the present invention as defined by the appended claims.

What is claimed is:

1. A pressure sensor comprising: a casing having a pressure detection chamber; a diaphragm for receiving pressure of a measuring object and disposed on the casing; and a pressure detection element for detecting the pressure, wherein the pressure detection chamber is filled with liquid, and the diaphragm contacts the liquid, wherein the pressure detection element is disposed in the pressure detection chamber to receive the pressure of the liquid, wherein the diaphragm has a plate shape with a radius of R and includes a circumference and a center of the plate, the circumference being fixed to the casing, wherein the diaphragm further includes a corrugate disposed concentrically with the center of the diaphragm and having a half circular cross-section and a top of the half circle, and wherein the top of the corrugate is disposed within a distance of 0.6 R from the center of the diaphragm.

2. The pressure sensor according to claim 1, wherein the top of the corrugate is disposed within a distance of 0.5 R from the center of the diaphragm.

3. The pressure sensor according to claim 1, wherein the top of the corrugate is disposed at a distance of 0.5 R from the center of the diaphragm.

4. The pressure sensor according to claim 1, wherein the radius of the diaphragm is equal to or smaller than 6 mm.

5. A pressure sensor comprising: a casing having a pressure detection chamber filled with liquid; a diaphragm for receiving pressure of a measuring object and for covering the pressure detection chamber to seal the liquid; and a pressure detection element disposed in the pressure detection chamber for detecting the pressure of the liquid, wherein the diaphragm includes a corrugate with a top thereof, and wherein the top of the corrugate is disposed within a predetermined distance from a center of the diaphragm, wherein the diaphragm has a plate shape with a radius of R, wherein the corrugate disposed concentrically with the center of the diaphragm, and wherein the top of the corrugate is disposed within a distance of 0.6 R from the center of the diaphragm.

6. The pressure sensor according to claim 5, wherein the diaphragm includes a circumference fixed to the casing, wherein the corrugate has a half circle cross-section, and wherein the top of the corrugate is disposed within a distance of 0.5 R from the center of the diaphragm.

7. The pressure sensor according to claim 6, wherein the diaphragm is made of metallic material, and wherein the corrugate is disposed on the opposite side of the liquid.

8. The pressure sensor according to claim 7, wherein the radius of the diaphragm is equal to or smaller than 6 mm.

* * * * *